United States Patent [19]
Toudo et al.

[11] Patent Number: 5,614,053
[45] Date of Patent: Mar. 25, 1997

[54] METHOD OF PRESS-MOLDING CERAMIC GREEN SHEET LAMINATE

[75] Inventors: Tatsuya Toudo; Tadahiro Nakagawa; Toshiyuki Nomura; Haruhiko Mori; Shigehiro Nojiri, all of Nagaokakyo, Japan

[73] Assignee: Murata Manufacturing Co., Ltd., Japan

[21] Appl. No.: 346,898

[22] Filed: Nov. 30, 1994

[30] Foreign Application Priority Data

Dec. 3, 1993 [JP] Japan .................................. 5-303907
Dec. 9, 1993 [JP] Japan .................................. 5-309285

[51] Int. Cl.$^6$ .................................................. B32B 31/20
[52] U.S. Cl. ........................... 156/312; 156/89; 264/65
[58] Field of Search ........................ 156/89, 312; 264/65, 264/61, DIG. 57

[56] References Cited

U.S. PATENT DOCUMENTS 5,174,842  12/1992  Hamuro et al. ............................. 156/89

FOREIGN PATENT DOCUMENTS 4-217383  8/1992  Japan .
2269132   2/1994  United Kingdom .
2271314   4/1994  United Kingdom .

OTHER PUBLICATIONS

Great Britain Search Report dated 16 Feb. 1995.

Primary Examiner—David A. Simmons
Assistant Examiner—M. Curtis Mayes
Attorney, Agent, or Firm—Ostrolenk, Faber, Gerb & Soffen, LLP

[57] ABSTRACT

A method of press-molding a ceramic green sheet laminate for stacking a plurality of ceramic green sheets with each other and pressing the laminate thus obtained along its thickness by carrying out a first pressurization cycle including steps of pressurizing the laminate at a pressure value $P_3$ and reducing the pressure to a value $P_2$, and subsequently carrying out a second pressurization cycle including a step of pressurizing the laminate at a pressure value $P_4$ and a pressure reduction step.

20 Claims, 7 Drawing Sheets

METHOD OF PRESS-MOLDING CERAMIC GREEN SHEET LAMINATE

BACKGROUND OF THE INVENTION

1. Field of the Invention

The present invention relates to a method of press-molding a ceramic green sheet laminate, for pressing a ceramic green sheet laminate which is formed by stacking a plurality of ceramic green sheets with each other along its thickness thereby molding the same, and more particularly, it relates to a method of press-molding a ceramic green sheet laminate with an improved pressure profile for pressing the ceramic green sheet laminate along its thickness.

2. Description of the Background Art

In order to manufacture ceramic multilayer electronic parts such as multilayer capacitors, for example, a plurality of mother ceramic green sheets printed with internal electrode materials are stacked with each other and a proper number of unprinted mother ceramic green sheets are stacked on the uppermost and lowermost ones of the printed ceramic green sheets, thereby obtaining a ceramic green sheet laminate. Thereafter the ceramic green sheet laminate is pressed along its thickness so that the ceramic green sheets are compression-bonded to each other and the laminate is molded. Then, the mother laminate thus obtained is cut along its thickness, to obtain laminate raw chips in units of individual ceramic multilayer electronic parts. The laminate raw chips thus obtained are fired to obtain ceramic sintered bodies, which in turn are provided with external electrodes on outer surfaces thereof.

In the aforementioned manufacturing method, the ceramic green sheet laminate is pressed along its thickness to be press-molded since it is impossible to obtain ceramic sintered bodies consisting of densely sintered ceramics, and layer breakage such as delamination is caused unless the ceramic green sheets are sufficiently brought into close contact with each other. Thus, the mother ceramic green sheet laminate is subjected to the aforementioned pressing step so that the ceramic green sheets strongly adhere to each other.

An example of the aforementioned method of press-molding a ceramic green sheet laminate is described with reference to FIGS. 1 and 2.

A lower mold section 1 having a cavity 1a and an upper mold section 2 are employed for press-molding the ceramic green sheets. A plurality of green sheets 3 are introduced into the cavity 1a of the lower mold section 1, and stacked with each other. Thereafter the upper mold section 2 which is sized to be receivable in the cavity 1a is placed on the ceramic green sheet laminate as formed, and a pressure P is applied from above for press-molding the ceramic green sheet laminate. The lower mold section 1 is mounted on a lower ram 4 of a press, while the upper mold section 2 is mounted on an upper ram 5 thereof. FIG. 2 shows a pressure profile obtained in practice. A pressure was gradually applied from the upper mold section 2 so that the ceramic green sheet laminate was pressed at the pressure level P for a prescribed time T after a lapse of a time $t_1$, and thereafter the pressure was gradually reduced over a time $t_2$, thereby pressing the ceramic green sheet laminate. The pressure value P was about 350 tons in general, while the times $t_1$, T and $t_2$ were about 120 to 180 seconds, about 60 seconds and about 120 to 180 seconds respectively.

In the aforementioned method of press-molding a ceramic green sheet laminate, it is necessary to apply constant force per unit area, in order to reliably compression-bond the ceramic green sheets 3 with each other. Therefore, the pressure P as required must be increased as the area of each ceramic green sheet 3 is increased.

When the pressure P is increased, however, the overall dimensions of the press provided with the lower mold section 1 and the upper mold section 2 must inevitably be increased. Thus, it is necessary to employ a high-priced press which requires a large space.

When the pressure P is increased, further, distortion which is applied to the ceramic green sheets 3 in response thereto is inevitably increased. In manufacturing ceramic multilayer electronic parts such as multilayer capacitors, therefore, positions of internal electrodes which are printed on the ceramic green sheets are displaced due to such distortion, and hence it is difficult to obtain ceramic electronic parts having desired characteristics.

SUMMARY OF THE INVENTION

An object of the present invention is to provide a method of press-molding a ceramic green sheet laminate which can compression-bond a plurality of ceramic green sheets with each other with a lower pressure, as well as inhibit occurrence of distortion in the ceramic green sheets.

According to a broad aspect of the present invention, provided is a method of press-molding a ceramic green sheet laminate for stacking a plurality of ceramic green sheets with each other and pressing the laminate thus formed with a press along its thickness, which comprises stages of preparing a ceramic green sheet laminate, and pressing the ceramic green sheet laminate by repeating a plurality of times a pressurization cycle which includes a pressurization stage of pressurizing the ceramic green sheet laminate with a prescribed pressure and a pressure reduction stage.

The inventive method of press-molding a ceramic green sheet laminate is preferably employable for a method of manufacturing ceramic multilayer electronic parts such as multilayer capacitors or ceramic multilayer substrates, for example, and this method is also applicable to any other method which must obtain a laminate by bringing a plurality of ceramic green sheets into close contact with each other.

According to the present invention, a ceramic green sheet laminate is first prepared by stacking a plurality of ceramic green sheets with each other. In this case, electrode materials forming internal electrodes may be provided on first surfaces or first and second surfaces of an arbitrary number of ceramic green sheets by printing or the like, or a plurality of only unprinted ceramic green sheets may be stacked with each other.

The aforementioned stage of preparing a ceramic green sheet laminate can be carried out by an arbitrary method which is employed in a general method of manufacturing ceramic multilayer electronic parts such as multilayer capacitors or ceramic multilayer substrates.

In the method according to the present invention, the pressurization cycle including the pressurization stage of pressurizing the ceramic green sheet laminate with a prescribed pressure and the pressure reduction stage is repeated a plurality of times, in order to press the ceramic green sheet laminate along its thickness. Thus, the pressurization cycle is repeated a plurality of times, so that a pressure increase step is carried out a plurality of times and a step of pressing the ceramic green sheet laminate while maintaining a constant pressure is also carried out a plurality of times. Therefore, it is possible to bring the ceramic green sheets into close contact with each other without increasing the maximum pressure for pressurizing the laminate. In the pressurization cycle which is carried out a plurality of times, the pressurization stage may be repeated at the same or different pressure values. In the pressurization cycle, further, the pressure reduction stage may also be repeated at the same or different pressure values.

Preferably there is a large difference between the pressure value employed in the pressurization stage and that finally attained in the pressure reduction stage, so that it is possible to further improve adhesion between the ceramic green sheets in subsequent repetition of the pressurization cycle.

In the method of press-molding a ceramic green sheet laminate according to the present invention, the aforementioned pressurization cycle is repeated a plurality of times for pressing the ceramic green sheet laminate. Therefore, the ceramic green sheet laminate is pressed a plurality of times under intensified pressure values, whereby the ceramic green sheets strongly adhere to each other. Thus, it is possible to reduce the maximum pressure for pressurization to not more than ½, for example, as compared with the prior art.

Therefore, the molding pressure can be reduced so that the ceramic green sheet laminate can be press-molded with a smaller press-molding machine as compared with the conventional method, whereby it is possible to reduce the cost for products which are prepared from the ceramic laminate as well as to narrow a space for arranging the press-molding machine.

Further, it is possible to reduce the molding pressure, whereby distortion applied to the ceramic green sheets can be reduced for effectively preventing a defect such as displacement of the internal electrodes, for example. Therefore, when the present invention is applied to a method of manufacturing ceramic multilayer electronic parts, for example, it is possible to stably supply electronic parts having desired characteristics, thereby improving reliability thereof.

In addition, it is possible to employ ceramic green sheets having larger areas, whereby productivity of the ceramic green sheet laminate can be improved when the present invention is applied to a method of manufacturing ceramic multilayer electronic parts, for example.

According to a specific aspect of the present invention, the aforementioned press has upper and lower mold sections which are brought into contact with upper and lower surfaces of the ceramic green sheet laminate respectively, and regions of the upper and lower mold sections which are brought into contact with the ceramic green sheet laminate have thicknesses which are at least ½ of the longest sides of the ceramic green sheets. According to this structure, it is possible to reduce dispersion in compression bonding in the ceramic green sheet laminate, as clearly understood from embodiments of the present invention described later.

Thus, according to the present invention, it is possible to obtain ceramic multilayer electronic parts having high reliability, which have hardly any layer breakage such as delamination in laminate raw chips obtained from a press-molded mother ceramic green sheet laminate after firing. When the present invention is applied to multilayer ceramic capacitors, for example, it is possible to prevent reduction in capacitance and deterioration of insulation resistance caused by delamination.

Further, it is possible to reduce dispersion in pressing of the ceramic green sheet laminate, whereby the laminate can be increased in size for reducing the cost by increasing the number of products manufactured in a single process.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings, for clarifying the present invention.

Figure 3:
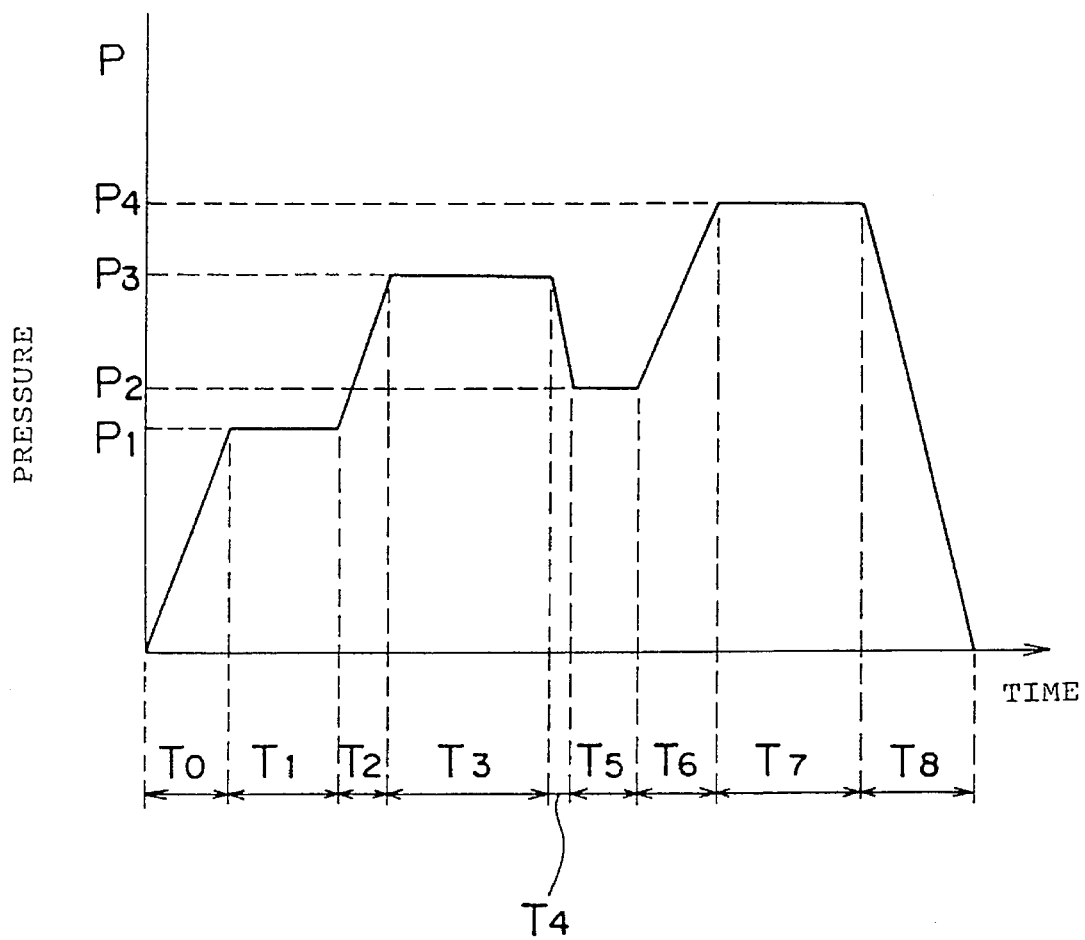
FIG. 3 illustrates a pressure profile in a press-molding method according to a first embodiment of the present invention.
Figure 4:
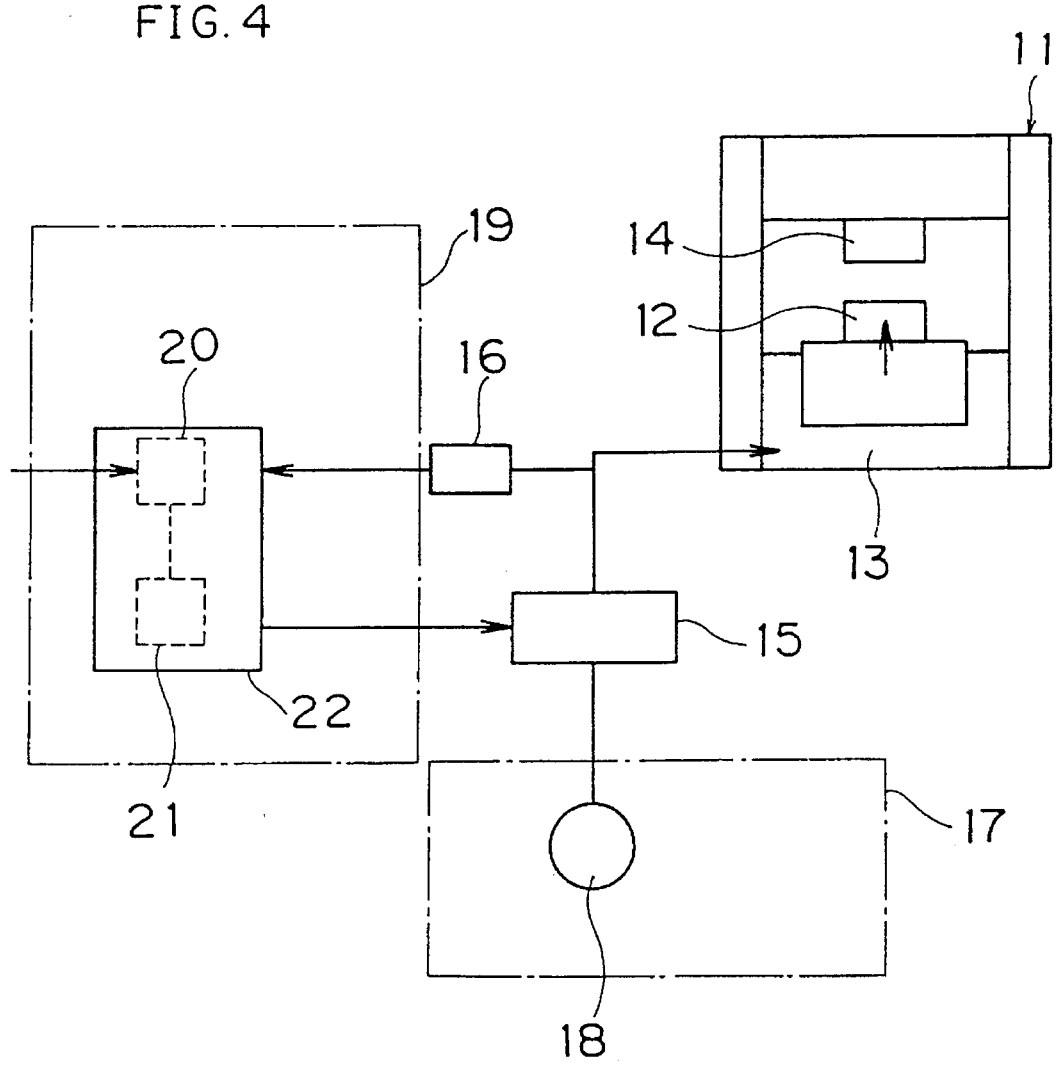
FIG. 4 is a schematic block diagram showing a press-molding machine employed in the press-molding method according to the first embodiment of the present invention.

FIG. 3 shows a pressure profile in a method of press-molding a ceramic green sheet laminate according to a first embodiment of the present invention, and FIG. 4 is a schematic block diagram showing a press-molding machine.

First, a ceramic green sheet laminate is arranged in a lower mold section 12 which is set in a press 11 of the press-molding machine shown in FIG. 4. The lower mold section 12, which is simply outlined in FIG. 4, is similar in structure to the lower mold section 1 shown in FIG. 1, and has an upwardly opened cavity. The ceramic green sheet laminate is received in this cavity.

The press 11 has a hydraulic cylinder 13 for vertically moving the lower mold section 12. An upper mold section 14 is arranged above the lower mold section 12. This upper mold section 14 is fixed to the body of the press 11.

As outlined in FIG. 4, the hydraulic cylinder 13 is connected with a hydraulic servo valve 15, and a pressure detector 16 is connected to a hydraulic circuit part provided between the hydraulic servo valve 15 and the hydraulic cylinder 13. The hydraulic servo valve 15 is connected with a hydraulic pump 18, which is stored in a hydraulic unit 17. Further, the hydraulic servo valve 15 and the pressure detector 16 are electrically connected with a control unit 19, which is provided with a pressure controller 22 having an amplifier 20 and a servo amplifier 21.

In the press-molding machine shown in FIG. 4, the control unit 19 opens/closes the hydraulic servo valve 15 for supplying oil to the hydraulic cylinder 13 as a pressure medium, thereby upwardly moving the lower mold section 12 for pressurizing the ceramic green sheet laminate. In this case, the pressure detector 16 measures the pressure value and supplies the pressure value as measured to the control unit 19, which in turn compares the received measured value with an initial set pressure, i.e., a set value. If the measured value is displaced from the set value, the control unit 19 supplies the servo valve 15 with a signal for adjusting the degree of opening/closing thereof in response to the pressure displacement. Thus, the press 11 reliably pressurizes the ceramic green sheet laminate with a prescribed pressure.

According to this embodiment, pressurization and pressure reduction stages are carried out through the aforementioned hydraulic circuit and the control unit 19, whereby pressurization and pressure reduction can be readily performed at a high speed.

Referring to FIG. 3, the pressure which is applied to the ceramic green sheet laminate which is arranged in the press 11 is first increased for a time $T_0$, to preliminarily pressurize the laminate at a pressure value $P_1$ for a time $T_1$. In this case, it is possible to arbitrarily set the pressure value $P_1$ and the preliminary pressurization time $T_1$ in response to the number, the dimensions and the thicknesses of the ceramic green sheets as stacked.

Then, the pressure is increased to a value $P_3$ during a time $T_2$, to carry out a first main pressurization stage for a time $T_3$.

Thereafter the pressure is reduced to a value $P_2$ during a time $T_4$, and maintained at this level for a time $T_5$.

Then, the pressure is increased from the value $P_2$ to a value $P_4$ during a time $T_6$, to carry out a second main pressurization stage for a time $T_7$ by pressurizing the laminate at the pressure value $P_4$.

Finally, the pressure is reduced from the value $P_4$ to the normal level during a time $T_8$.

Figure 2:
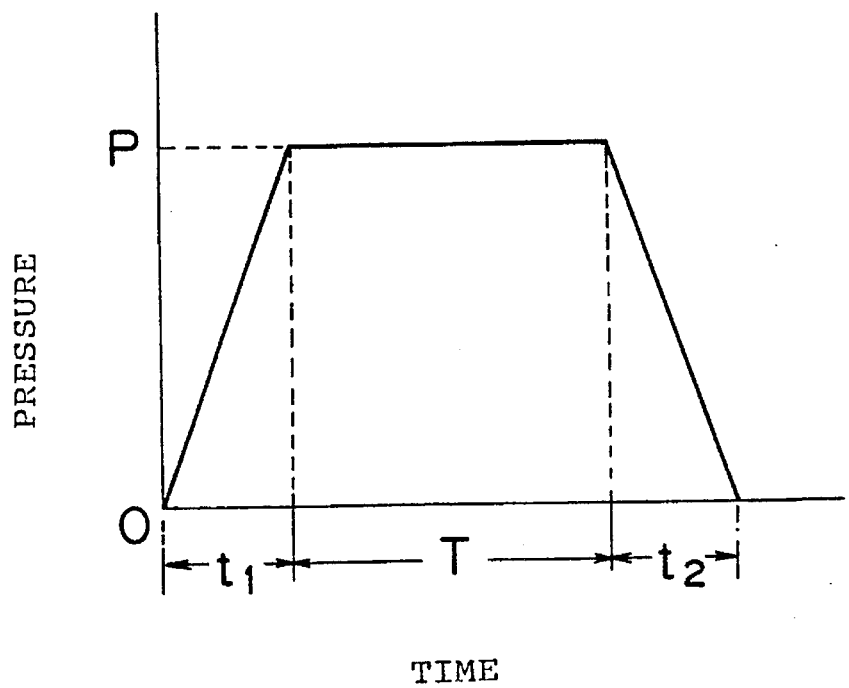
FIG. 2 illustrates a pressure profile in the conventional method of press-molding a ceramic green sheet laminate.

As clearly understood from the aforementioned pressure profile, the ceramic green sheet laminate is preliminarily pressurized at the pressure value $P_1$ and thereafter subjected to a plurality of pressurization stages at the two levels of pressure values $P_3$ and $P_4$ according to this embodiment. Due to such a plurality of pressure increase steps, therefore, it is possible to pressurize the ceramic green sheet laminate at the pressure values $P_3$ and $P_4$ which are lower than the pressure value P (see FIG. 2) employed in the conventional method.

While the pressure values $P_3$ and $P_4$ in the first and second main pressurization stages are different from each other ($P_4 > P_3$) in FIG. 3, the pressurization stages also may be carried out at the same pressure value, which can be properly decided in response to the number, the thicknesses and the dimensions of the ceramic green sheets. The pressurization times $T_3$ and $T_7$ employed in the main pressurization steps can also be arbitrarily decided.

While two main pressurization stages are carried out in this embodiment, a greater number of main pressurization stages can be carried out as long as the number is times of at least twice.

While the step of reducing the pressure to the value $P_2$ is carried out between the first and second main pressurization stages, the pressure value $P_2$ employed for this pressure reduction and the time $T_5$ for maintaining this value can also be arbitrarily decided. Further, this pressure reduction stage can also be carried out a plurality of times of at least twice, and the pressure value to be attained after pressure reduction can also be arbitrarily decided.

The press 11 shown in FIG. 4 is simply adapted to increase the pressure from the value $P_1$ for the preliminary pressurization step to the value $P_3$ for the first main pressurization stage and to reduce the same from the value $P_3$ to the value $P_2$, whereby it is possible to quickly carry out the pressure increase and pressure reduction stages without substantially changing the stroke of the hydraulic cylinder 13.

The pressurization cycle, including the pressurization stage up to the value $P_3$ and the pressure reduction stage toward the pressure value $P_2$, for example, can be carried out a plurality of times per second. In an experiment made by the inventors, it was possible to carry out the pressurization cycle 0.5 to 5 times per second with the machine shown in FIG. 4.

In the embodiment shown in FIG. 3, it is impossible to unequivocally state the pressure values $P_1$ to $P_4$ and the times $T_0$ to $T_8$, which are properly decided in response to the number, the thicknesses and the dimensions of the ceramic green sheets. In order to press-mold a ceramic green sheet laminate which is obtained by stacking a plurality of ceramic green sheets, however, the following conditions can be employed:

Pressure Values: $P_1 = 1$ ton, $P_2 = 5$ tons, $P_3 = 150$ tons, and $P_4 = 160$ tons Times: $T_0 = 0.1$ sec., $T_1 = 2$ to 3 sec., $T_2 = 0.2$ sec., $T_3 = 0.3$ sec., $T_4 = 0.2$ sec., $T_5 = 0.3$ sec., $T_6 = 0.2$ sec., $T_7 = 0.3$ sec., and $T_8 = 0.3$ sec.

Figure 5:
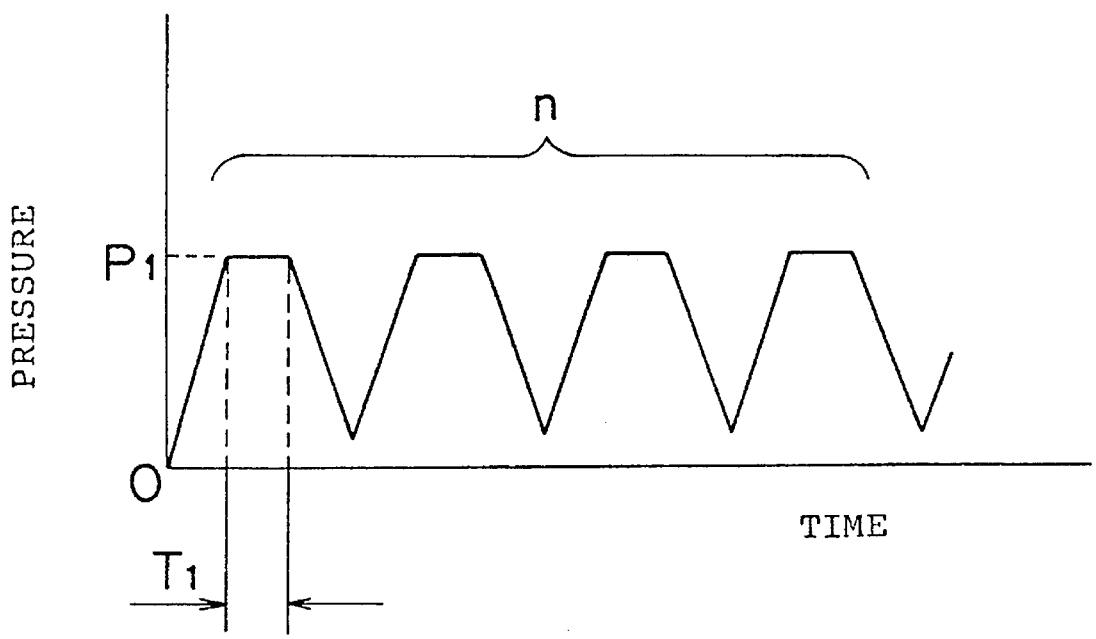
FIG. 5 illustrates a pressure profile in a press-molding method according to a second embodiment of the present invention.

FIG. 5 illustrates a pressure profile in a method of press-molding a ceramic green sheet laminate according to a second embodiment of the present invention. As shown in FIG. 5, it may also be possible to press a ceramic green sheet laminate by repeating a pressurization cycle including a pressurizing stage of increasing a pressure which is applied to the laminate to a value $P_1$ and maintaining this value $P_1$ for a time $T_1$ and a pressure reduction stage of thereafter reducing the pressure to a value $P_2$ n times (n: natural number). It has been confirmed that the pressure value $P_1$ can be reduced to about 50 to 60% of the pressure value P employed in the conventional method shown in FIG. 2, and the time $T_1$ can also be reduced to about 1/50 of the pressurization time T employed in the conventional method in this case.

In this embodiment, pressurization times $T_0$ to $T_8$ can be properly decided in response to the number, the thicknesses and the dimensions of ceramic green sheets.

While the machine shown in FIG. 4 is adapted to vertically press the ceramic green sheet laminate, it is possible to apply the pressure in a direction other than the vertical direction, as long as the machine can press the ceramic green sheet laminate along its thickness.

The inventors have discovered that it is possible to reduce dispersion in compression bonding in the ceramic green sheet laminate thus obtained, by selecting thicknesses of the upper and lower mold sections which are brought into contact with the ceramic green sheet laminate for press-molding the same, thereby preventing a layer breakage phenomenon such as delamination. This is now described with reference to FIGS. 6 to 10.

Figure 6:
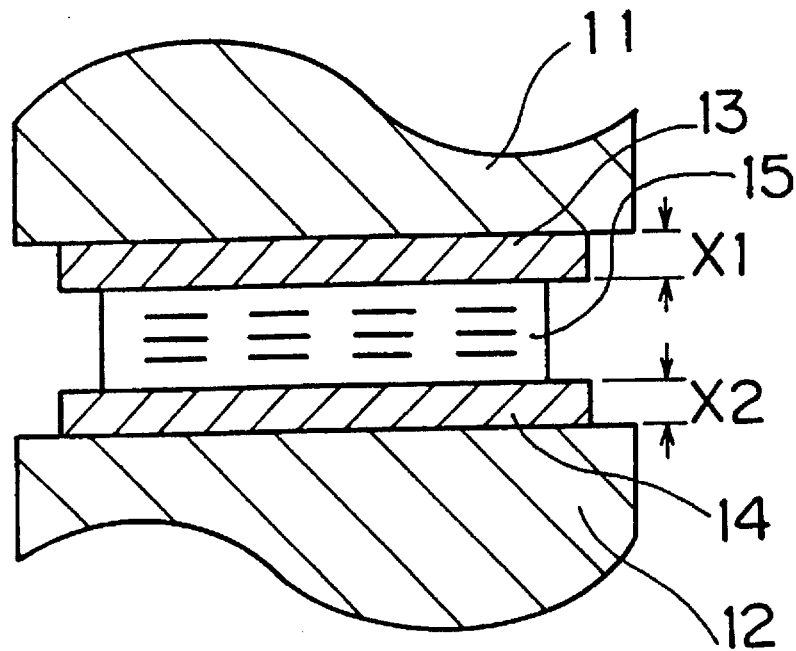
FIG. 6 is a partially fragmented sectional view for illustrating a portion provided with a mold and a ceramic green sheet laminate in a conventional method of press-molding a ceramic green sheet laminate.
Figure 7:
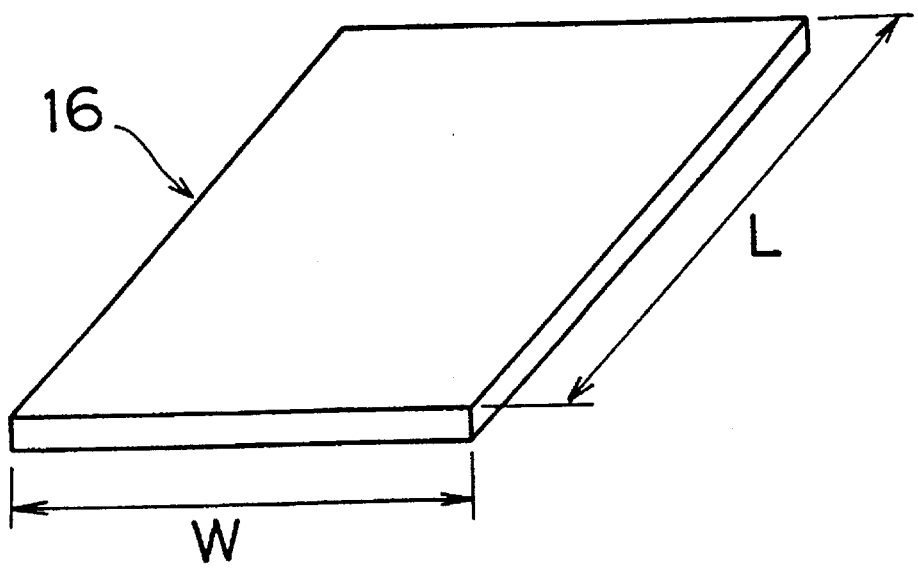
FIG. 7 is a perspective view showing a ceramic green sheet.

FIG. 6 is a partially fragmented sectional view for illustrating a conventional press-molding step for a ceramic green sheet laminate. Referring to FIG. 6, upper and lower mold sections 13 and 14 are mounted on upper and lower rams 11 and 12 of a press-molding machine respectively. The upper and lower mold sections 13 and 14 are prepared from plate type materials, so that the upper mold section 13 is formed by a plate having a thickness X1 while the lower mold section 14 is formed by a plate having a thickness X2.

In general, the upper and lower mold sections 13 and 14 are formed by plates having the smallest possible thicknesses, in order to attain miniaturization. Therefore, the thicknesses X1 and X2 are so minimized as to be not more than ⅓ of longer sides of the ceramic green sheets as stacked, when the ceramic green sheets have rectangular shapes.

However, a mother ceramic green sheet laminate 15 which is press-molded through the upper and lower mold sections 13 and 14 shown in FIG. 6 is generally increased in thickness in its central portion and reduced in thickness in its peripheral portion. Namely, the ceramic green sheet laminate 15 has relatively large dispersion in thickness. This is conceivably because the pressure which is applied across the upper and lower mold sections 13 and 14 is reduced in central portions of upper and lower surfaces of the ceramic green sheet laminate 15 and increased in peripheral portions. Consequently, the ceramic green sheets tend to be insufficiently compression-bonded to each other in the central portion of the mother ceramic green sheet laminate 15 after press-molding. When the mother ceramic green sheet laminate 15 is cut along its thickness to obtain a plurality of raw chips in units of a plurality of ceramic multilayer electronic parts, therefore, the raw chips obtained from the central portion of the mother ceramic green sheet laminate 15 easily cause a layer breakage phenomenon such as delamination after firing.

In order to reduce such dispersion in compression bonding in the aforementioned region of the ceramic green sheet laminate, a method according to a third embodiment of the present invention employs upper and lower mold sections having large thicknesses, as shown in FIGS. 7 to 10.

While this embodiment is adapted to press a mother ceramic green sheet laminate through steps described below, this mother ceramic green sheet laminate is obtained by stacking a plurality of mother ceramic green sheets printed with internal electrode materials and stacking a proper number of unprinted mother ceramic green sheets on the uppermost and lowermost ones of the printed ceramic green sheets. This mother ceramic green sheet laminate is adapted to provide multilayer ceramic capacitors.

The internal electrode materials are formed by applying conductive paste on the mother ceramic green sheets by means such as screen printing and drying the same. The conductive paste contains a metal material having a high melting point such as platinum, palladium, an alloy thereof or an alloy of such a metal and silver, or a base metal material such as nickel or copper as a conductive component.

The ceramic green sheets are obtained by sheet-forming paste which is prepared by mixing proper ceramic powder of barium titanate ceramics, for example, with a binder and a solvent by a method such as a doctor blade coater or a roll coater. Each of such ceramic green sheets has a shape illustrated in FIG. 7, for example. A ceramic green sheet 16 shown in FIG. 7 has a rectangular plane shape, with longer and shorter sides of lengths L and W respectively. Namely, L>W. Alternatively, the ceramic green sheet 16 may have a square plane shape.

According to this embodiment, the aforementioned internal electrode material is printed on an upper surface of each ceramic green sheet 16, and a plurality of such mother ceramic green sheets 16 printed with the internal electrode materials are stacked with each other while a plurality of unprinted mother ceramic green sheets are further stacked on the uppermost and lowermost ones of the printed green sheets, for preparing a mother ceramic green sheet laminate.

Figure 8:
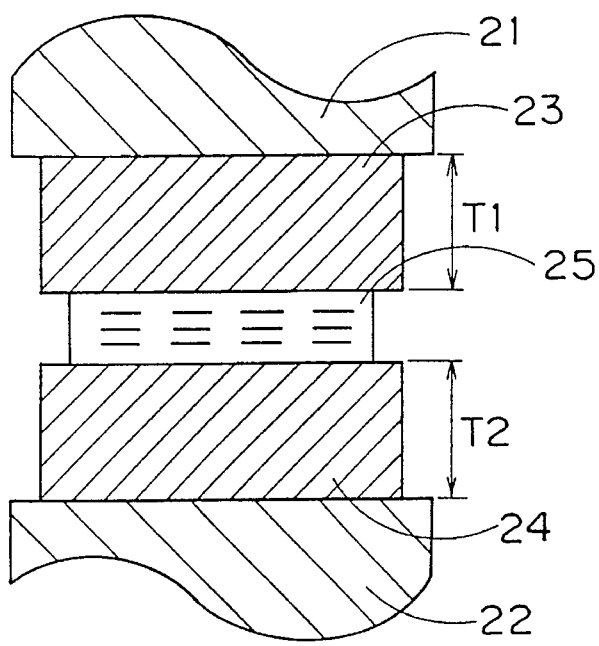
FIG. 8 is a partially fragmented sectional view for illustrating a principal part of a mold employed in a press-molding method according to a third embodiment of the present invention.

Then, the mother ceramic green sheet laminate is press-molded by a molding machine shown in FIG. 8, in order to compression-bond the mother ceramic green sheets with each other in advance of firing.

As shown in FIG. 8, a mother ceramic green sheet laminate 25 is arranged between upper and lower mold sections 23 and 24. The upper and lower mold sections 23 and 24 are mounted on upper and lower rams 21 and 22 of the molding machine respectively.

According to this embodiment, the upper and lower mold sections 23 and 24 are formed by metal plates having thicknesses $T_1$ and $T_2$ respectively.

According to this embodiment, further, the thicknesses $T_1$ and $T_2$ of the upper and lower mold sections 23 and 24 are at least ½ of the length L of the longer sides of the ceramic green sheets 16. Therefore, dispersion in compression bonding is reduced in the mother ceramic green sheet laminate 25 which is press-molded. This is now described with reference to results of a concrete experiment.

Figure 9:
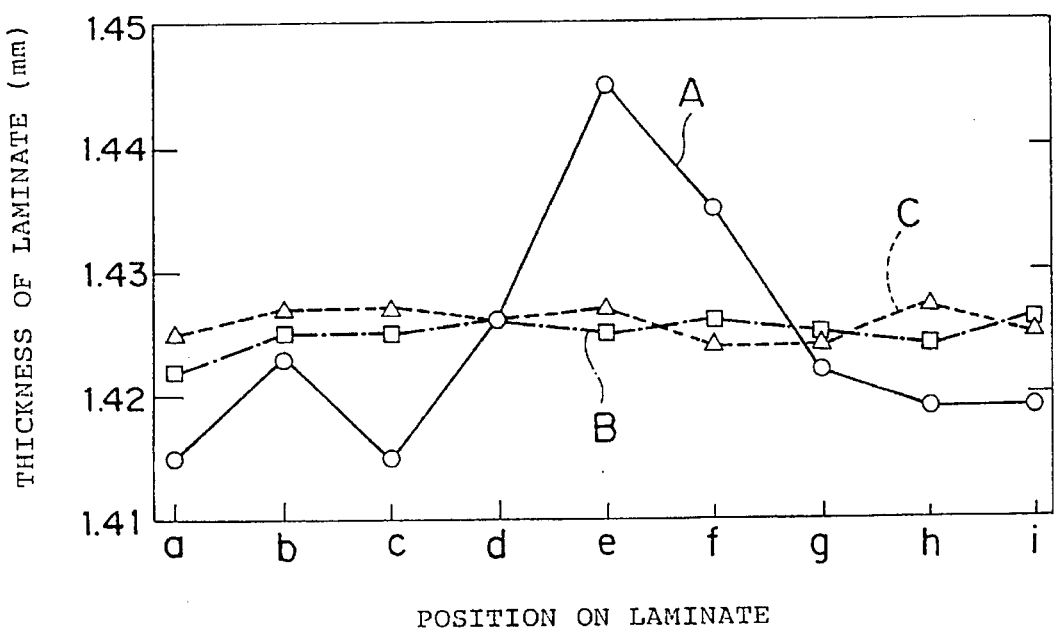
FIG. 9 is a graph for illustrating dispersion in thicknesses of ceramic green sheet laminates, with axes of abscissas and ordinates showing positions in the ceramic green sheet laminates and the thicknesses of the laminates respectively.

Mother ceramic green sheet laminates were pressed similarly to the first embodiment, with the upper and lower mold sections 23 and 24 having thicknesses $T_1$ and $T_2$ which were ⅓, ½ and ¾ of the length L of the longer sides of the ceramic green sheets 16. FIG. 9 shows the results of the experiment.

Figure 10:
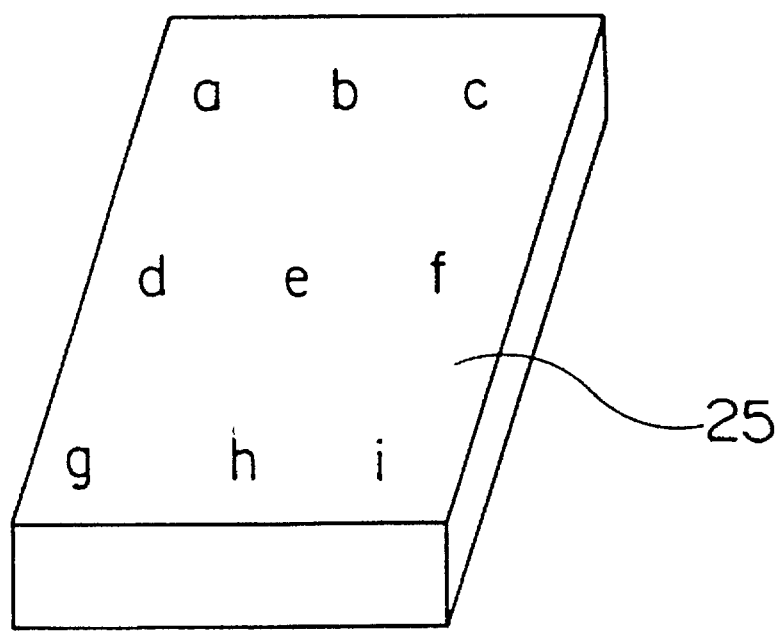
FIG. 10 is a perspective view showing a ceramic green sheet laminate.

Referring to FIG. 9, the axis of abscissas shows positions on the mother ceramic green sheet laminates with symbols a to i, as shown in FIG. 10. On the other hand, the axis of ordinates shows the thicknesses of the laminates.

A solid line A, a one-dot chain line B and a broken line C appearing in FIG. 9 show thickness dispersion levels of the laminates pressed through the upper and lower mold sections having the thicknesses $T_1$ and $T_2$ which were ⅓, ½ and ¾ of the length L of the longer sides of the ceramic green sheets 16 respectively.

As clearly understood from FIG. 9, the thickness of the laminate 25 as pressed was dispersed over the range of 1.415 mm to 1.445 mm when the thicknesses $T_1$ and $T_2$ of the upper and lower mold sections 23 and 24 were ⅓ of the length L of the longer sides of the ceramic green sheets 16, with considerably large thickness dispersion of about 30 μm. When the thicknesses $T_1$ and $T_2$ were ½ and ¾ of the length L of the longer sides of the ceramic green sheets 16, on the other hand, the thicknesses of the laminates 25 were dispersed over the range of 1.420 mm to 1,430 mm, with extremely small thickness dispersion of about 10 μm. Thus, it is understood possible to reduce the thickness dispersion to about ⅓ as compared with the prior art by setting the thicknesses $T_1$ and $T_2$ of the upper and lower mold sections 23 and 24 to be at least ½ of the length L of the longer sides of the ceramic green sheets 16.

While the thicknesses $T_1$ and $T_2$ were equal to each other in the aforementioned experiment, these thicknesses $T_1$ and $T_2$ may be different from each other, so far as the same are at least ½ of the length of the longer sides of the ceramic green sheets.

Figure 1:
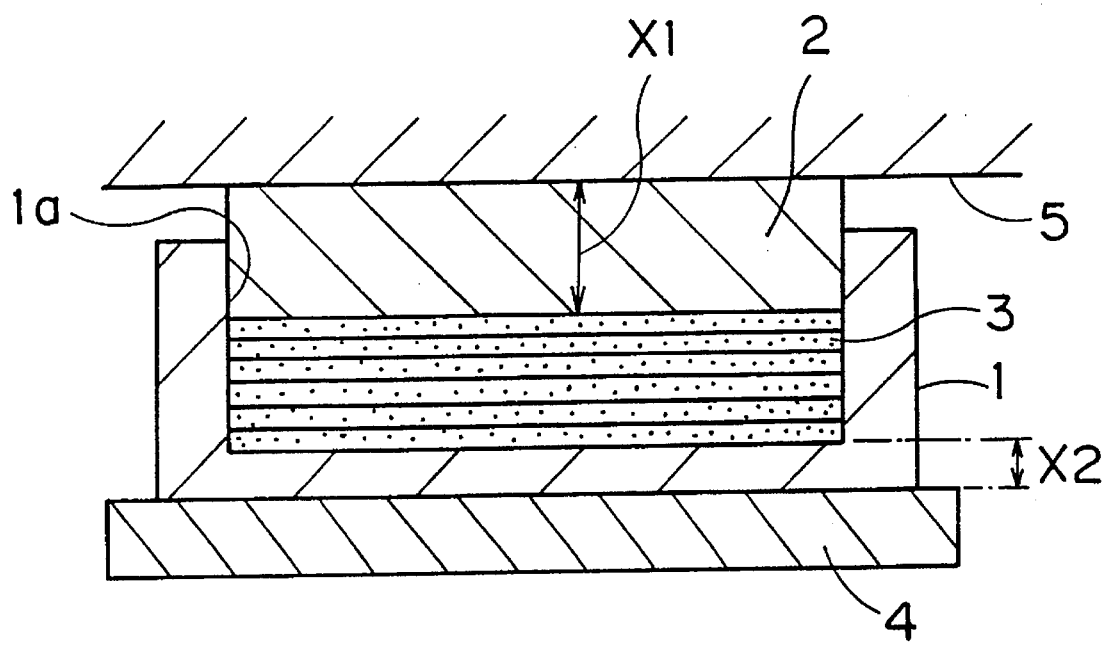
FIG. 1 is a sectional view for illustrating a conventional method of press-molding a ceramic green sheet laminate.

While the upper and lower mold sections 23 and 24 are formed by the plates having the thicknesses $T_1$ and $T_2$ respectively as shown in FIG. 8, the lower mold section may be replaced by that having an upwardly opened cavity, similarly to the lower mold section 1 of the press-molding machine shown in FIG. 1. In this case, the thickness X2 of the portion of the lower mold section 1 which is brought into contact with the ceramic green sheet laminate 3 shown in FIG. 1 may be set in a similar manner to the aforementioned thickness $T_2$.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of press-molding a ceramic green sheet laminate for stacking a plurality of ceramic green sheets with each other and pressing a laminate thus obtained with a press along its thickness, said method comprising the steps of:

preparing a ceramic green sheet laminate by stacking a plurality of ceramic green sheets with each other; and pressing said ceramic green sheet laminate along its thickness by repeating a pressurization cycle, which includes a pressurization stage of pressurizing said ceramic green sheet laminate at a prescribed pressure, and a pressure reduction stage, wherein said pressure reduction stage is carried out by applying a pressure value greater than zero.

2. The method of press-molding a ceramic green sheet laminate in accordance with claim 1, wherein said pressurization stage included in said pressurization cycle being carried out a plurality of times is carried out at the same pressure value in each said pressurization cycle.

3. The method of press-molding a ceramic green sheet laminate in accordance with claim 1, wherein said pressurization stage included in said pressurization cycle being carried out a plurality of times is carried out at different pressure values in respective said pressurization cycles.

4. The method of press-molding a ceramic green sheet laminate in accordance with claim 3, wherein a second one of said pressurization stages is carried out at a greater pressure value than a first one of said pressurization stages.

5. The method of press-molding a ceramic green sheet laminate in accordance with claim 1, further comprising a step of preliminarily pressurizing said ceramic green sheet laminate at a preliminary pressure valve in advance of said pressing step.

6. The method of press-molding a ceramic green sheet laminate in accordance with claim 5, wherein a second said pressurization stage is carried out at a greater pressure value than a first said pressurization stage.

7. The method of press-molding a ceramic green sheet laminate in accordance with claim 6, wherein a pressure value at a pressure reduction stage between said first and second pressurization stages is greater than said preliminary pressure value.

8. The method of press-molding a ceramic green sheet laminate in accordance with claim 5, wherein said step of preliminarily pressurizing is followed by first and second pressurizing stages, and a pressure value at a pressure reduction stage between said first and second pressurization stages is greater than said preliminary pressure value.

9. The method of press-molding a ceramic green sheet laminate in accordance with claim 1, wherein said pressurization cycle is carried out 0.5 to 5 times per second.

10. The method of press-molding a ceramic green sheet laminate in accordance with claim 9, wherein each said pressurization stage is 0.3 seconds in length.

11. The method of press-molding a ceramic green sheet laminate in accordance with claim 10, wherein each said pressure reduction stage is 0.3 seconds in length.

12. The method of press-molding a ceramic green sheet laminate in accordance with claim 1, wherein each said pressurization stage is 0.3 seconds in length.

13. The method of press-molding a ceramic green sheet laminate in accordance with claim 12, wherein each said pressure reduction stage is 0.3 seconds in length.

14. The method of press-molding a ceramic green sheet laminate in accordance with claim 1, wherein each said pressure reduction stage is 0.3 seconds in length.

15. A method of press-molding a ceramic green sheet laminate for stacking a plurality of ceramic green sheets with each other and pressing a laminate thus obtained with a press along its thickness, said method comprising the stages of:

preparing a ceramic green sheet laminate by stacking a plurality of ceramic green sheets with each other; and pressing said ceramic green sheet laminate along its thickness by carrying out a pressurination cycle, which includes a pressurization stage of pressurizing said ceramic green sheet laminate at a prescribed pressure and a pressure reduction stage;

wherein said press has upper and lower mold section being brought into contact with upper and lower surfaces of said ceramic green sheet laminate respectively, regions of said upper and lower mold sections being brought into contact with said ceramic green sheet laminate having thicknesses of at least ½ of the longest sides of said ceramic green sheets.

16. The method of press-molding a ceramic green sheet laminate in accordance with claim 15, wherein said regions of said upper and lower mold sections being brought into contact with said ceramic green sheet laminate are equal in thickness to each other.

17. The method of press-molding a ceramic green sheet laminate in accordance with claim 16, wherein said upper and lower mold sections are formed by plates.

18. The method of press-molding a ceramic green sheet laminate in accordance with claim 15, wherein said regions of said upper and lower mold sections being brought into contact with said ceramic green sheet laminate are different in thickness from each other.

19. The method of press-molding a ceramic green sheet laminate in accordance with claim 18, wherein said upper and lower mold sections are formed by plates.

20. The method of press-molding a ceramic green sheet laminate in accordance with claim 15, wherein said upper and lower mold sections are formed by plates.

* * * * *